(12) United States Patent
Jokura (10) Patent No.: US 6,522,485 B2
(45) Date of Patent: Feb. 18, 2003

(54) OPTICAL CONNECTOR

(75) Inventor: Kiyoshi Jokura, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 10/024,543

(22) Filed: Dec. 21, 2001

(65) Prior Publication Data

US 2002/0097510 A1 Jul. 25, 2002

(30) Foreign Application Priority Data

Jan. 19, 2001 (JP) ........................................ 2001-011710

(51) Int. Cl.[7] .............................. G02B 7/02; G02B 6/38
(52) U.S. Cl. ........................................ 359/811; 385/52
(58) Field of Search ................................ 359/811, 818, 359/819; 385/52, 53, 56, 55, 60, 76, 78, 84, 86

(56) References Cited

U.S. PATENT DOCUMENTS 6,151,432 A * 11/2000 Nakajima et al. ............. 385/60
6,450,695 B1 * 9/2002 Matsumoto ................... 385/60
6,454,466 B1 * 9/2002 Weigel et al. ................. 385/80

FOREIGN PATENT DOCUMENTS

JP 2000-221326 8/2000

* cited by examiner

Primary Examiner—Huy Mai
Assistant Examiner—Saeed Seyrafi
(74) Attorney, Agent, or Firm—Kanesaka & Takeuchi (57) ABSTRACT

An optical connector (31) comprises a housing (33), an optical element (3) incorporated in the housing (33), a retaining mechanism (15, 34, and 43) for retaining the optical element (3) in the housing (33) so that the optical element (3) can be replaced together with the housing (33) as a unit. The retaining mechanism (15, 34, or 43) comprises a stopper member (15) provided on the optical element (3) and a retaining member (34) provided on the housing (33) such that abutment of the stopper member (15) on the abutting portion of the housing (33) restricts movement of the optical element (3) toward one direction and abutment of the stopper member (15) on the retaining member (34) prevents separation of the optical element (3) from the housing (33).

5 Claims, 8 Drawing Sheets

OPTICAL CONNECTOR

BACKGROUND OF THE INVENTION

1. Field of the Invention

The present invention relates to optical connectors and, especially, to an optical connector having an optical element such as an attenuator or filter.

2. Description of the Related Art

Figure 7:
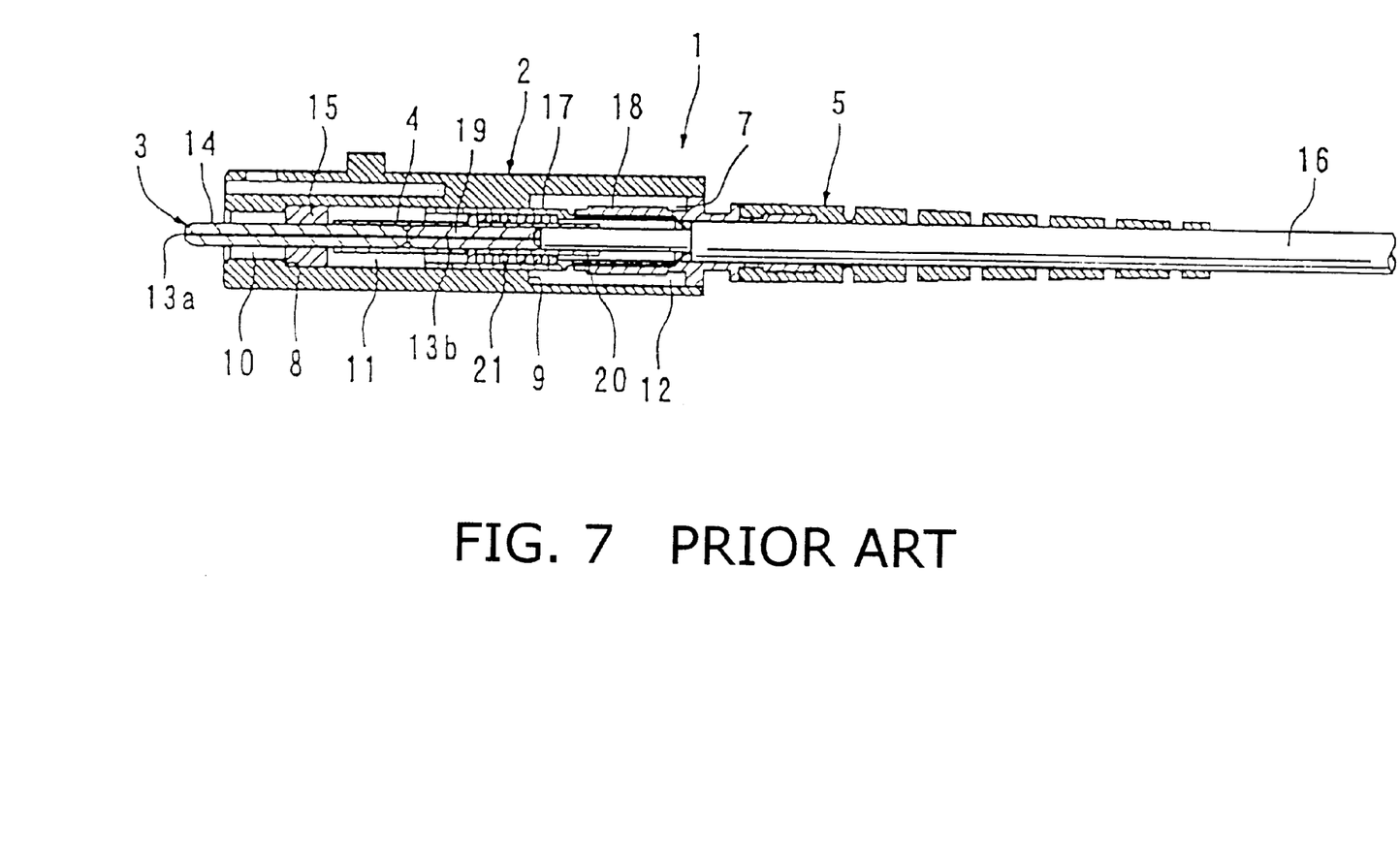
FIG. 7 is a sectional view of a conventional optical connector.
Figure 8:
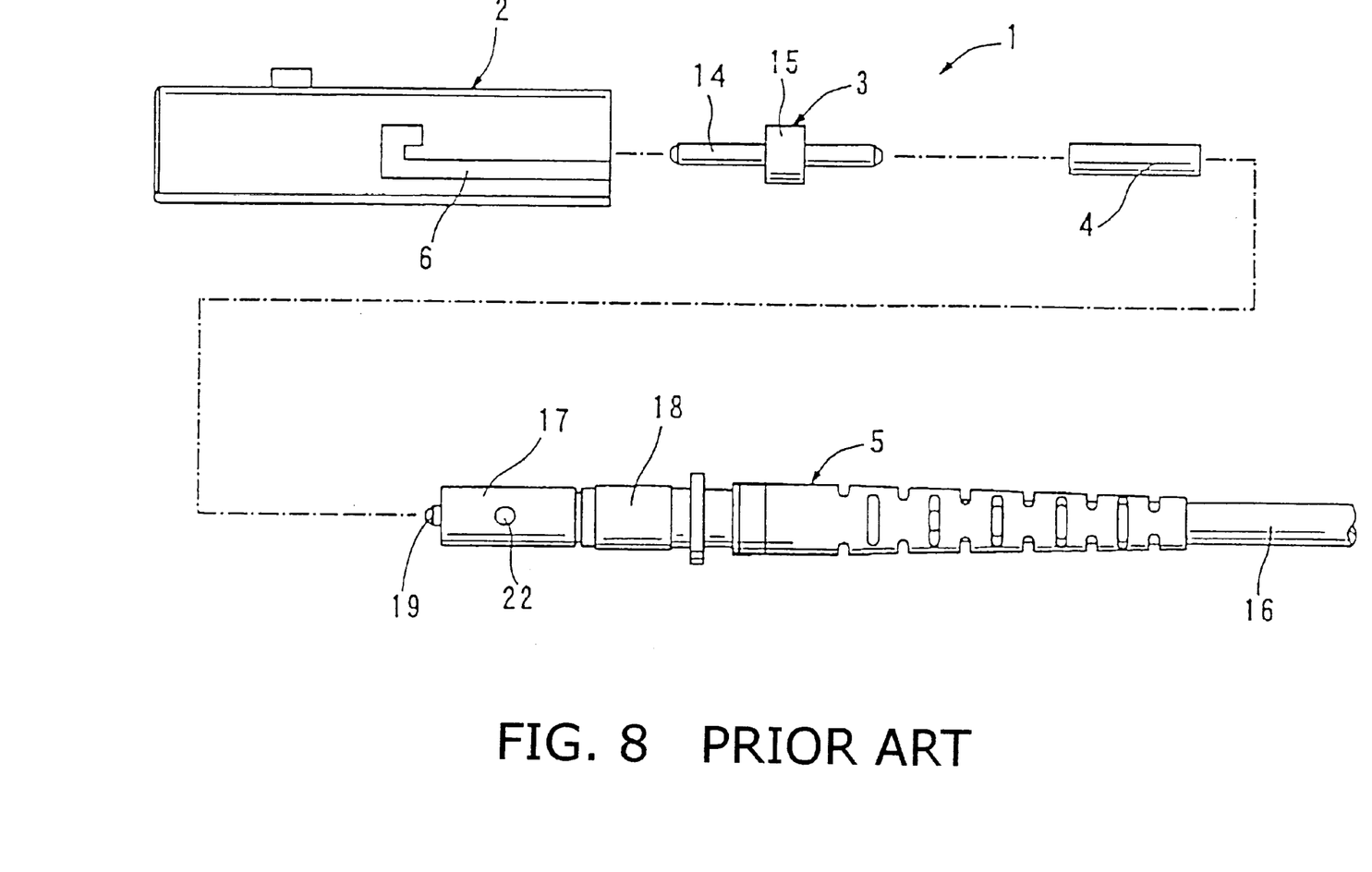
FIG. 8 is an exploded side view of the conventional optical connector.

Japanese patent application Kokai No. 2000-221326 discloses an optical connector having an attenuator or filter for attenuation or filtering function. As shown in FIGS. 7 and 8, this optical connector 1 comprises a housing 2, an optical element or attenuator 3 incorporated in the housing 2, an aligning sleeve 4 put over the attenuator 3 from the base side of the attenuator, and a body member 5 connected to the attenuator 3 via the aligning sleeve 4.

The housing 2 is made from a synthetic resin in the form of a cylinder and has a J-shaped engaging slot 6 provided in the side wall and a through-hole 7 in the axial direction. Also, it has first and second step portions 8 and 9 to form front, middle, and base sections 10, 11, and 12, respectively, so that the diameter of the through-hole 7 increases in a stepwise fashion.

The attenuator 3 comprises a ferrule for holding an optical fiber 13a having an attenuation function and an annular stopper member 15 attached to the central area of the ferrule 14. The stopper member 15 is made of a metal, for example, so as to have an outside diameter greater than the front section 10 but smaller than the middle section 11 and an identification mark on the outside surface to identify the attenuation characteristics and model No. of the attenuator 3. The aligning sleeve 4 has a cylindrical form and a slit in the axial direction to provide elasticity.

The body member 5 comprises an insulated cable 16, a fixing metal 17 for fixing the front portion of the insulated cable 16, a crimping metal 18 for fixing by crimping the insulated cable 16 to the fixing metal 17, a ferrule 19 for holding the front portion of an optical fiber 13b or another optical element, a sliding sleeve 20 fixed to the base side of the ferrule 19, and a coil spring 21 provided between the sliding sleeve 20 and the fixing metal 17 to bias the ferrule 19 forwardly. The fixing metal 17 has such a shape that it is fitted in the middle section 11 of the housing 2 and a projection 22 on the outside surface for engagement with the engaging slot 6.

To assemble such an optical connector 1, the attenuator 3 is put into the through-hole 7 through the base side of the housing 2, and the aligning sleeve 4 is put over the base side of the ferrule 14. Then, the body member 5 is pushed into the housing 2 such that the projection 22 engages the engaging slot 6. As a result, the fixing metal 17 fits in the middle section 11, the ferrule 19 fits in the base side of the aligning sleeve 4, and the front end of the stopper member 15 abuts on the first step portion 8. Then, the body member 5 is further pushed into the housing 2 such that the ferrule 19 abuts face-to-face on the ferrule 14 of the attenuator 3 so that the optical fibers 13a and 13b are connected to each other and the ferrule 19 is slid toward the base side along with the sliding sleeve 20 against the coil spring 21. Then, when the housing 2 is rotated in the predetermined direction and the pushing operation is terminated, the coil spring 21 brings the housing 2 toward the front side so that the projection 22 engages the engaging slot 6 to lock the body member 5 to the housing 2.

The above optical connector, however, requires a large amount of work for replacing the attenuator 3. That is, each of the attenuator 3, aligning sleeve 4, and body member 5 is removed from the housing 2 and, then, a new attenuator is put into the housing 2, followed by reassembling the aligning sleeve 4 and body member 5. In addition, the attenuator 3 is so small that it is difficult to read the identification mark, frequently resulting in the installation of a wrong attenuator or the loss of a replacement attenuator.

SUMMARY OF THE INVENTION

Accordingly, it is an object of the invention to provide an optical connector enabling to simplify the replacement operation and increase the efficiency of the operation.

According to the invention there is provided an optical connector, comprising a housing; an optical element provided in the housing; retaining means for preventing separation of the optical element from the housing so that the optical element can be replaced together with the housing as a unit; the retaining means comprising a stopper member; an abutment portion provided on the housing for abutment with one end of the stopper member to restrict movement of the optical element toward one end of the housing; a retaining member secured to the housing for abutment with the other end of the stopper member to restrict movement of the optical element toward the other side, thereby preventing the optical element from falling off from the housing.

It is preferred that it further comprises an aligning sleeve for aligning and holding the optical element and another optical element to be connected to the optical element and enabling to replace the optical element together with the housing and the aligning sleeve as a unit.

It is further preferred that the retaining member is made such that it is press-fitted into the housing from the other side of the stopper member, it is screwed into the housing from the other side of the stopper member, or that it is inserted into the housing through a slot in a side wall of the housing.

Since the optical element is made such that it is replaced together with the housing as a unit, the replacing operation is simplified, leading to the increased efficiency of the operation.

DESCRIPTION OF THE PREFERRED EMBODIMENT

In the following embodiments, the same components as those of the above conventional connector 1 will be given like reference numbers and their description will be omitted.

Figure 1:
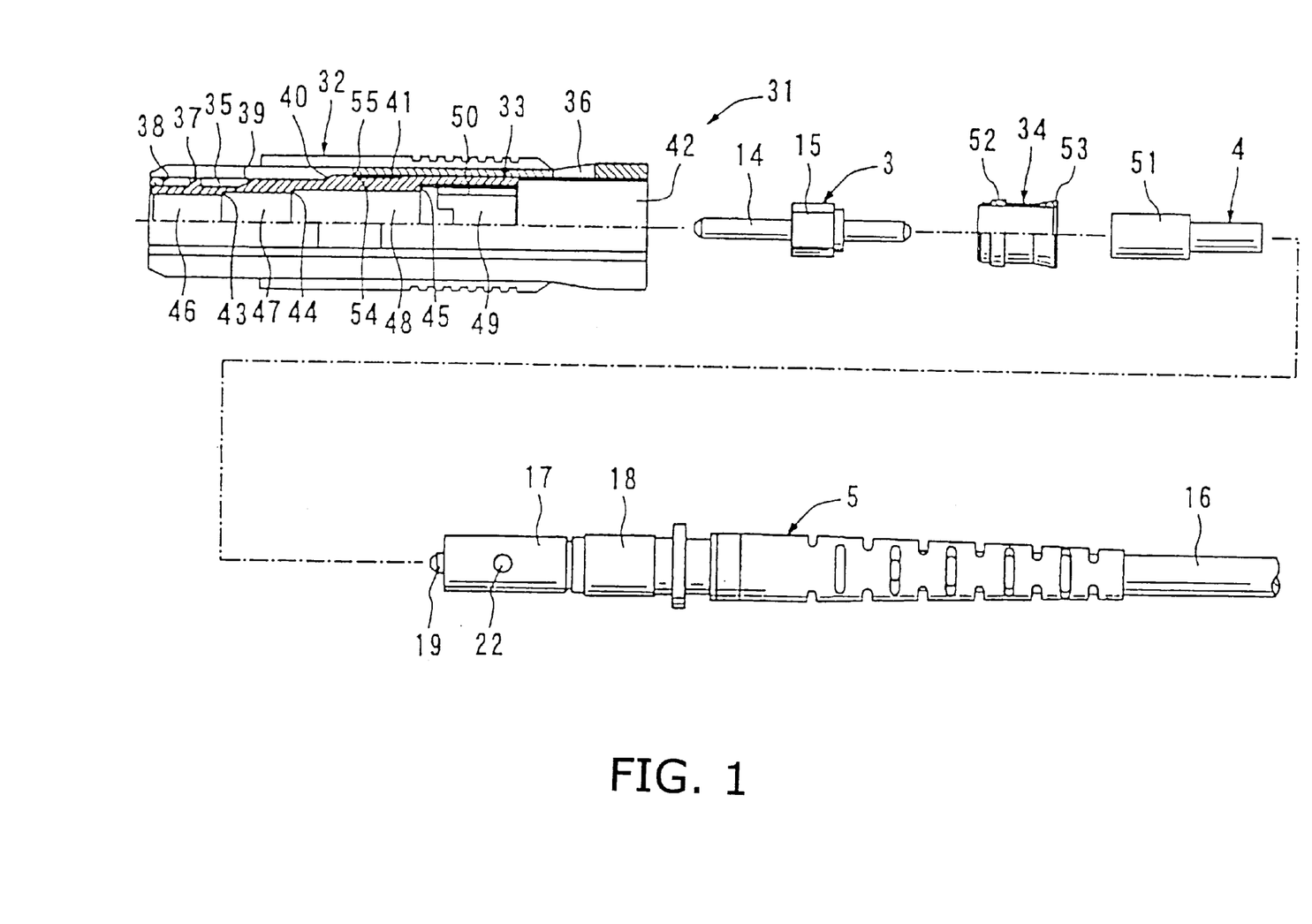
FIG. 1 is an exploded sectional view of an optical connector according to an embodiment of the invention.
Figure 2:
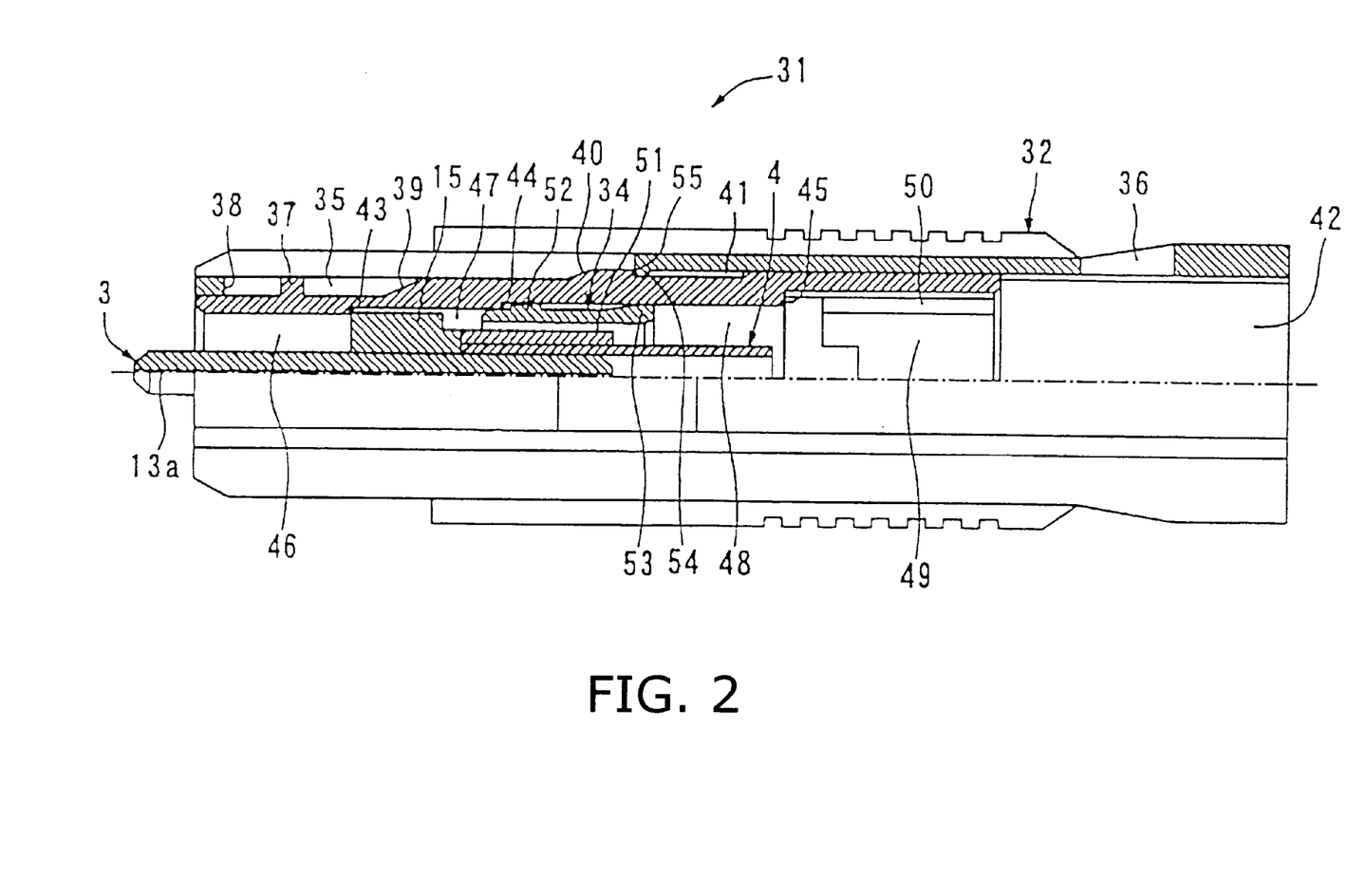
FIG. 2 is a partially sectional side view of the optical connector.

In FIGS. 1 and 2, an optical connector 31 comprises a case 32, a housing 33 accommodated in the case 32, an attenuator 3, a retaining member 34 press-fitted in the housing 33 from the base side of the housing 33, an aligning sleeve 4, and a body member 5.

The case 32 is made of a metal, for example, in the form of an elongated rectangular shape and an identification mark on the outside surface to identify the attenuation characteristics and model No. The case 32 has a front opening 35 at the front side, a rear opening 36 at the base side, and an inward projection 54 behind the first opening 35.

The housing 33 is made of a synthetic resin, for example, in the form of a tube and is slidable in the axial direction of the case 32. It has an outward projection 37 on the front portion for abutment with a front face 38 of the first opening 35. Also, it has first and second inclined surfaces 39 and 40 and a shallow indentation 41 behind the second inclined surface 40 so that the inward projection 54 abuts on the front face 55 of the indentation 41. Further, it has a J-shaped engaging slot 50 and a through-hole 42 in the axial direction, and first, second, and third step portions 43, 44, and 45 in the inside wall to enlarge stepwise the diameter of the through-hole 42 to form front, first middle, second middle, and base sections 46, 47, 48, and 49, respectively.

The attenuator 3 comprises a ferrule 14 for holding an optical fiber 13a and a stopper member 15 fixed to the central area of the ferrule 14. The stopper member 15 is made of a metal, for example, and has an outside diameter greater than the front section 46 but smaller than the first middle section 47, and the front end for abutment with the first step portion 43.

The aligning sleeve 4 is made of a zirconia, for example, in the form of a cylinder and has a slit in the axial direction for fitting in the base side of the ferrule 14. A retaining sleeve 51 made of a phosphorous bronze, for example, is fitted over the front portion of the aligning sleeve 4 to secure the aligning sleeve 4 to the ferrule 14.

The retaining member 34 is made of a stainless steel, for example, in the form of a cylinder and has an inside diameter of greater than the outside diameter of the retaining sleeve 51 but smaller than the stopper member 15 and the front end for abutment with the base of the stopper member 15. It has at the front portion a jaw portion 52 having a rounded inclined surface. Its base portion 53 has an inclined outside surface and a tapered inside surface.

How to assemble the optical connector 31 will be described.

The housing 33 is inserted into the case 32 from the base side of the case 32 such that the inward projection 54 slides on the inclined surface 40 and snaps in the indentation 41 to attach the housing 33 to the case 32 for sliding movement. The outward projection 37 abuts on the front face 38 of the front opening 35 to restrict forward movement of the housing 38 and the inward projection 54 abuts on the notched face 55 to restrict rearward movement of the housing 38 so that the housing 38 is slidable between them in the axial direction.

The attenuator 3 and then the retaining member 34 are inserted into the housing 33 from the base side of the housing. The front section and the remaining section with the jaw portion 52 and the base portion 53 of the retaining member 34 are press-fitted into the first and second middle sections 47 and 48, respectively, so that the retaining member 34 is fixed to the housing 33. The rounded front end and tapered jaw portion 52 and base portion 53 make this press-fitting operation easy.

Then, the aligning sleeve 4 with the retaining sleeve 51 is inserted from the base side of the housing 33 into the retaining member 34 and over the base portion of the ferrule 14. The body member 5 is pushed into the housing 33 such that the projection 22 engages the engaging slot 50 and the base portion of the aligning sleeve 4 fits over the ferrule 19. Consequently, the ferrule 19 is brought into end-to-end contact with the ferrule 14 of the attenuator 3 to connect the optical fibers 13a and 13b, and the body member 5 is locked to the housing 33. The front end of the stopper member 15 abuts on the first step portion 43 to restrict forward movement of the attenuator 3, aligning sleeve 4, and body member 5, and the base portion of the stopper member 15 abuts on the front end of the retaining member 34 to restrict their rearward movement so that they are retained in the housing 33 for sliding movement between them in the axial direction.

To replace the attenuator 3, the housing 33 is removed from the optical connector 31 in the reverse order of the above process, and another housing in which a new attenuator and a stopper member are incorporated is inserted into the body member 5 via the aligning sleeve 4. In this way, the number of components and operation steps for replacement of the attenuator 3 is made remarkably lower than that of the convention. The identification mark of the attenuator 3 is put in the outside surface of the housing 33 so that it is easy to read the identification mark, thus minimizing the installation of a wrong attenuator and maximizing the efficiency of the operation.

Figure 3:
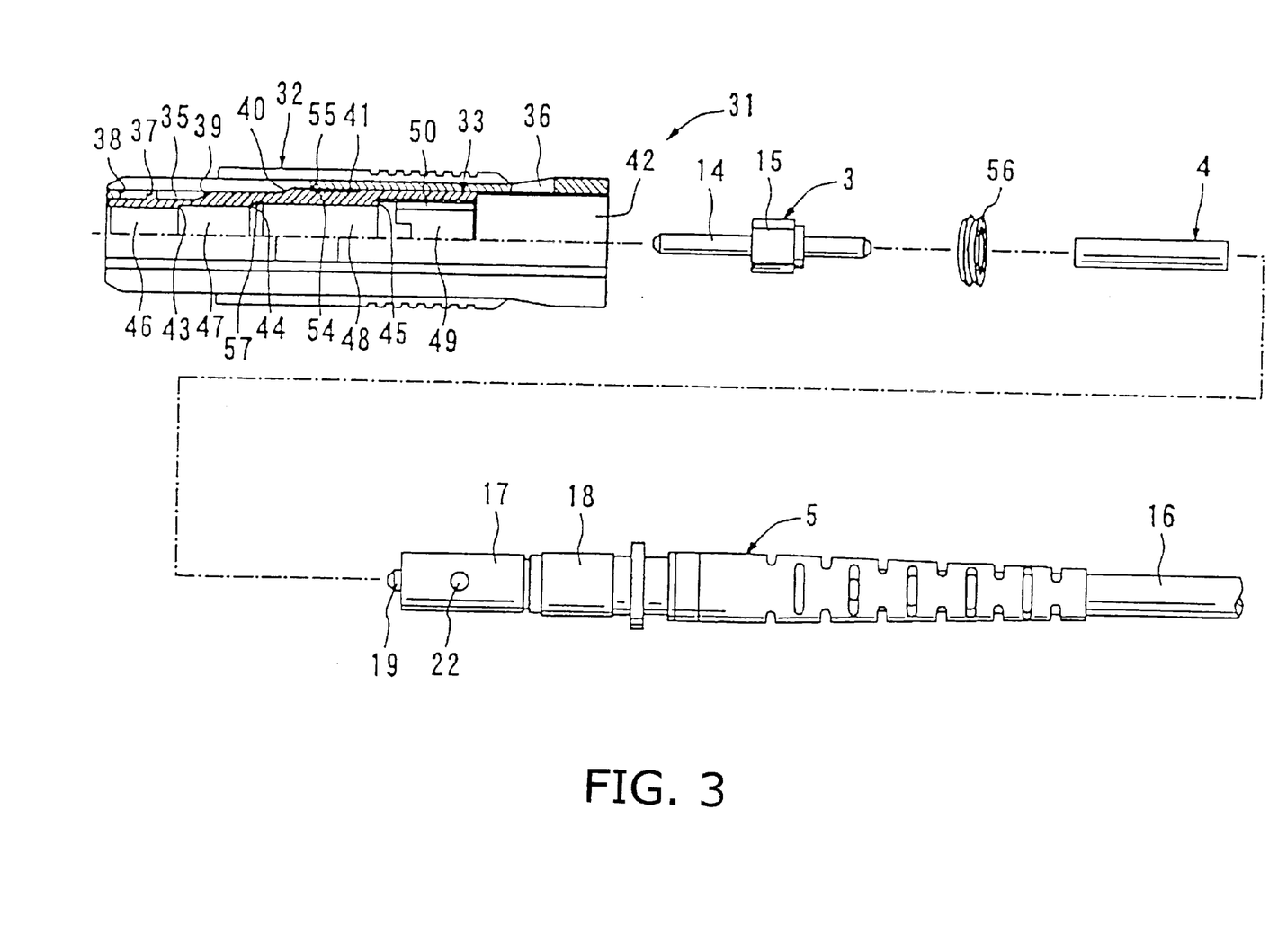
FIG. 3 is an exploded sectional view of an optical connector according to the second embodiment of the invention.

In FIG. 3, a stopper member 56 has an outside surface with a sew-tooth shape and is press-fitted into the housing 33 from the base side, and a fitting groove 57 is provided in the inside surface of the housing 33 to receive the stopper member 56.

Figure 4:
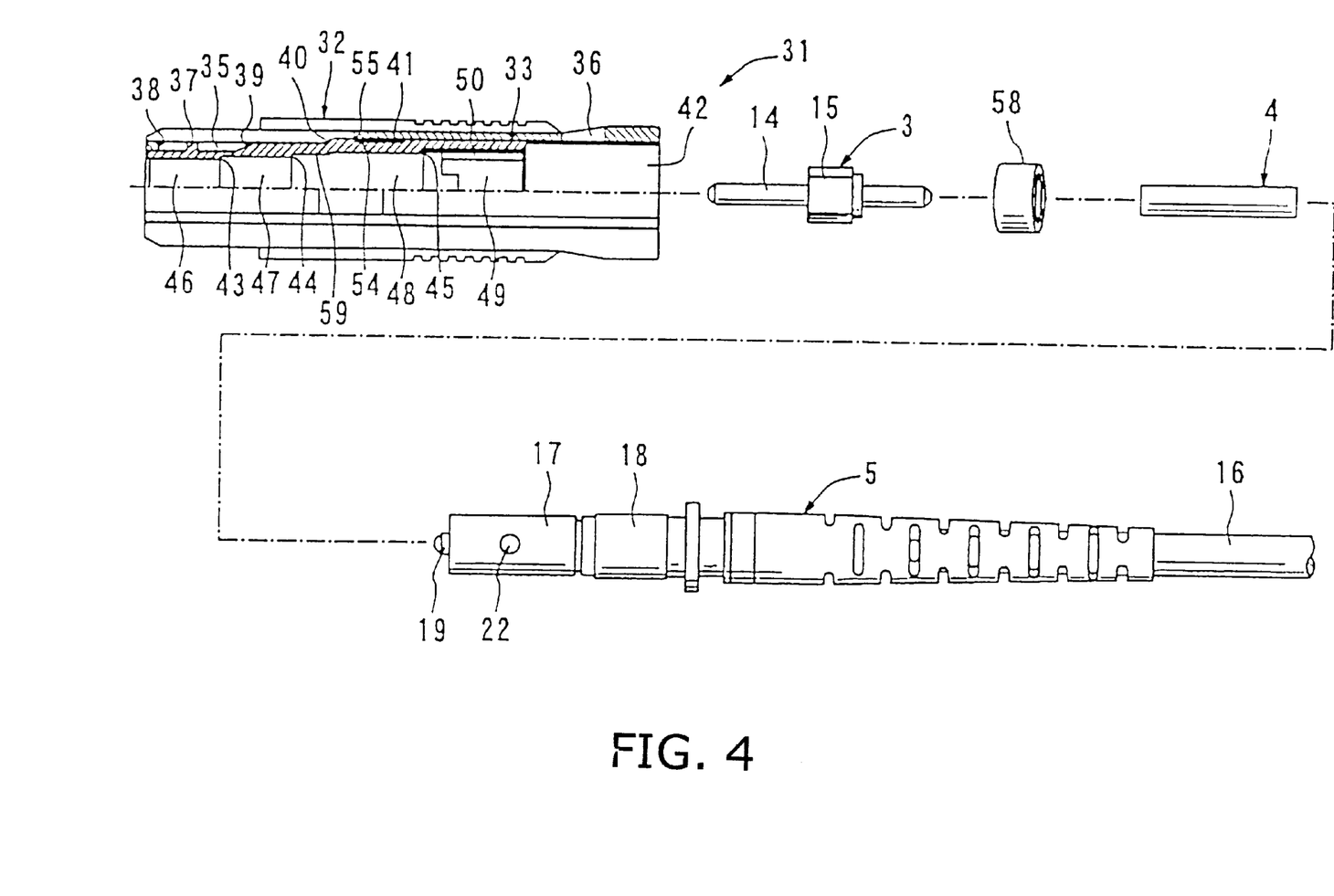
FIG. 4 is an exploded sectional view of an optical connector according to the third embodiment of the invention.

In FIG. 4, a retaining member 58 has a cylindrical form, and a press-fit portion 59 having an inside diameter smaller than the outside diameter of the retaining member 58 is provided on the inside surface of the housing. It is preferred that the base side of the press-fit portion 59 is tapered to facilitate the press-fit operation.

Figure 5:
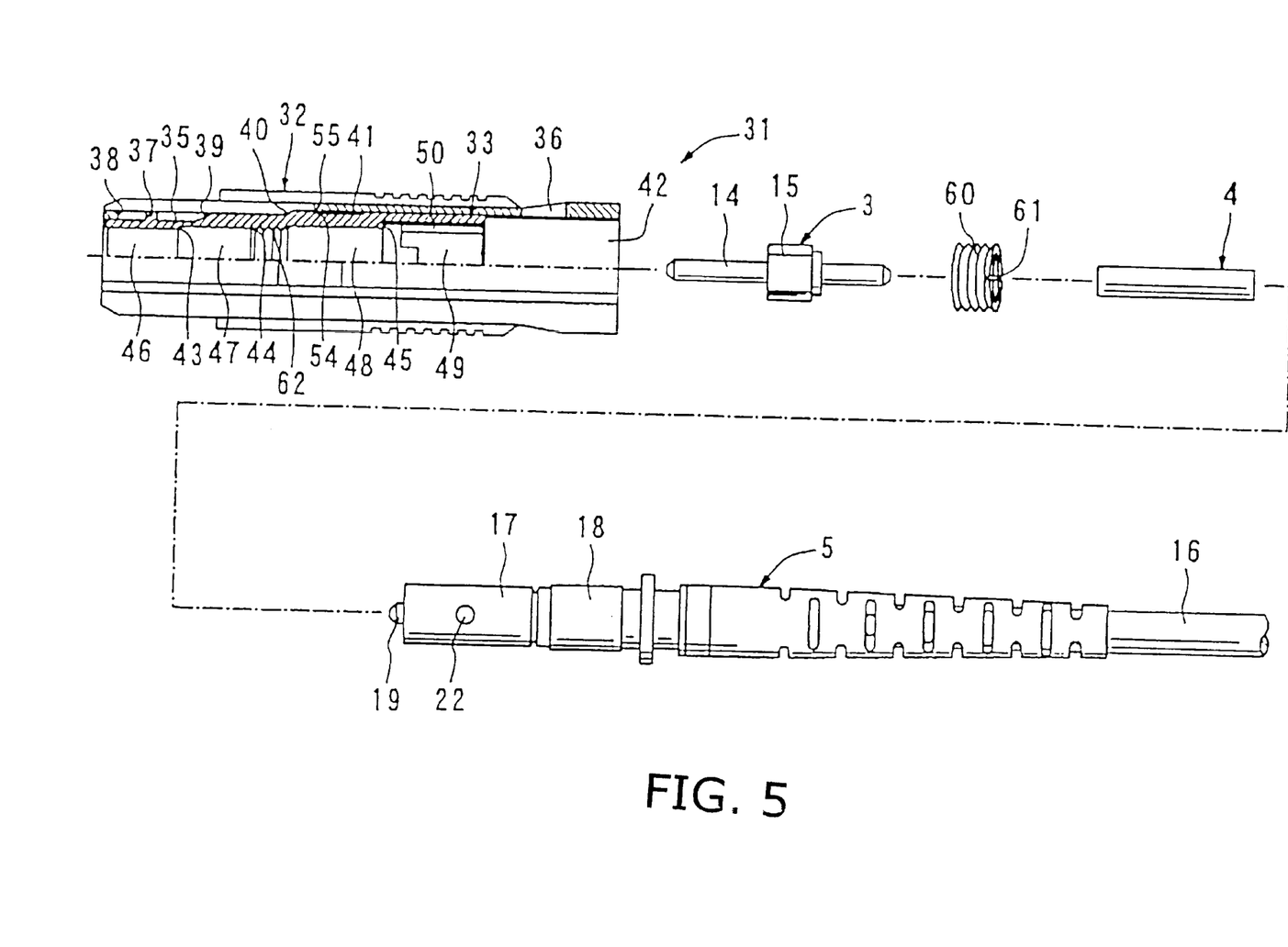
FIG. 5 is an exploded sectional view of an optical connector according to the fourth embodiment of the invention.

In FIG. 5, a retaining member 60 has a threaded side surface and a screw slit 61 in the base face, and a female thread 62 is provided in the inside surface of the housing 33 for engagement with the retaining member 60 to retain the attenuator 3 in the housing 33.

Figure 6:
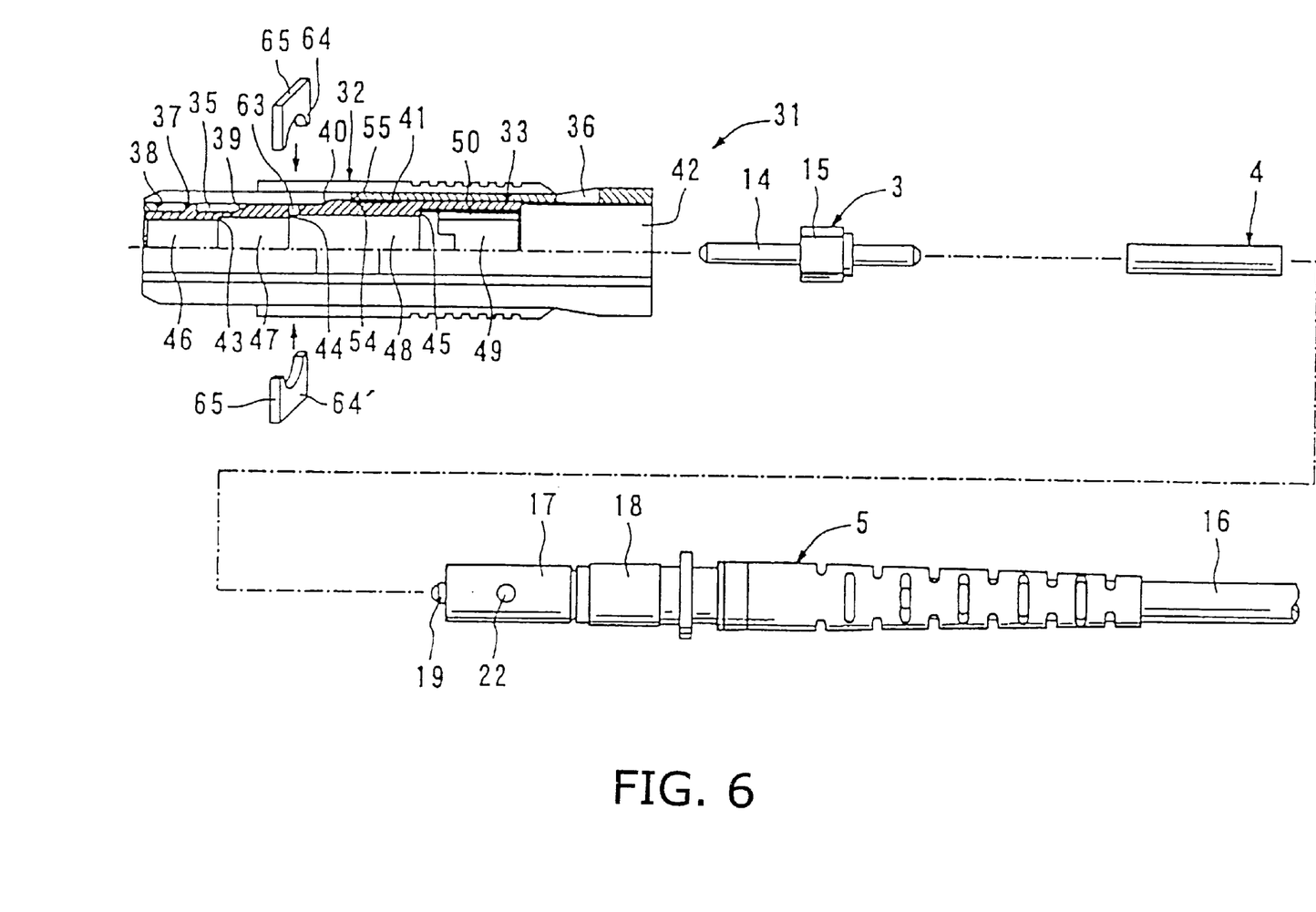
FIG. 6 is an exploded sectional view of an optical connector according to the fifth embodiment of the invention.

In FIG. 6, a pair of insertion slots 63 are provided in the housing 33 to receive a pair of half members 64 and 64' for forming a retaining member 65. The attenuator 3 is put into the housing 33, and the half members 64 and 64' are press-fitted in the insertion slots 63 behind the stopper member 15. The retaining member 65 may be bonded or welded to the housing 33. 25 It is appreciated that the pressure sleeve 51 of the embodiment in FIGS. 1–2 is not employed in the embodiments of FIGS. 3–6.

A modification may be made such that the attenuator 3 is inserted into the housing from the front side of the housing. The attenuator 3 may be replaced by a filter or isolator.

Another modification may be made such that the entire housing 33 with the aligning sleeve 4 is replaced instead of only the attenuator 3 and the retaining member 34 to further reduce the number of components and operation steps for replacement.

As has been described above, according to the invention, the number of components and operational steps for replacing the optical element is reduced so that the replacing operation is simplified. The identification mark of an optical element is put on the housing so that it is easy to read the ID mark, minimizing the installation of a wrong optical element. In addition, the replaceable housing minimizes the loss of a small component such as an attenuator, thus increasing the efficiency of operation.

What is claimed is:

1. An optical connector, comprising:

a housing;

an optical element provided in said housing;

retaining means for preventing separation of said optical element from said housing so that said optical element can be replaced together with said housing as a unit; said retaining means comprising:
 a stopper member;
 an abutment portion provided on said housing for abutment with one end of said stopper member to restrict movement of said optical element toward one end of said housing;
 a retaining member secured to said housing for abutment with the other end of said stopper member to restrict movement of said optical element toward the other side, thereby preventing said optical element from falling off from said housing.

2. The optical connector according to claim 1, which further comprises an aligning sleeve for aligning and holding said optical element and another optical element to be connected to said optical element and enabling to replace said optical element together with said housing and said aligning sleeve as a unit.

3. The optical connector according to claim 2, wherein said retaining member is made such that it is press-fitted into said housing from said other side of said stopper member.

4. The optical connector according to claim 2, wherein said retaining member is made such that it is screwed into said housing from said other side of said stopper member.

5. The optical connector according to claim 2, wherein said retaining member is made such that it is inserted into said housing through a slot in a side wall of said housing.

* * * * *